United States Patent [19]

Partridge et al.

[11] 4,079,751
[45] Mar. 21, 1978

[54] CHECK VALVE

[75] Inventors: Charles C. Partridge; Howard G. Boswell; Lawrence E. Branch, all of Houston, Tex.

[73] Assignee: FMC Corporation, San Jose, Calif.

[21] Appl. No.: 660,579

[22] Filed: Feb. 23, 1976

[51] Int. Cl.² ............................................. F16K 15/03
[52] U.S. Cl. ............................ 137/516.29; 137/512.1; 137/527; 251/364
[58] Field of Search ................. 137/512.1, 512.15, 527, 137/527.2, 527.4, 527.6, 527.8, 516.29; 251/298, 299, 303, 332, 364

[56] References Cited

U.S. PATENT DOCUMENTS

| 505,792 | 9/1893 | Henn | 137/527.2 |
|---|---|---|---|
| 2,756,017 | 7/1956 | Silverman | 137/527.8 X |
| 2,877,792 | 3/1959 | Tybus | 137/512.1 |
| 3,074,427 | 1/1963 | Wheeler | 137/512.1 |
| 3,144,876 | 8/1964 | Frye | 137/527.8 X |
| 3,295,550 | 1/1967 | Scaramucci | 137/527.4 |
| 3,538,946 | 11/1970 | Hilsheimer | 137/512.1 |
| 3,678,958 | 7/1972 | Satterwhite | 137/512.1 |
| 3,934,608 | 1/1976 | Guyton | 137/527.8 |

Primary Examiner—Robert G. Nilson
Attorney, Agent, or Firm—W. W. Ritt, Jr,

[57] ABSTRACT

A fluid flow check valve with two disc closure elements pivotally mounted in the valve's body. A concave surface on the upstream side of each disc assists in stabilizing the discs against flutter during flow through the valve, and angular lugs on the downstream side of the discs cooperate with a stop shaft to further stabilize the assembly when the discs are fully open. The valve also includes a resilient seat with an annular sealing bead to facilitate a high unit load on the seat at low pressures, and with a large seal area to support the discs at high back pressures.

8 Claims, 7 Drawing Figures

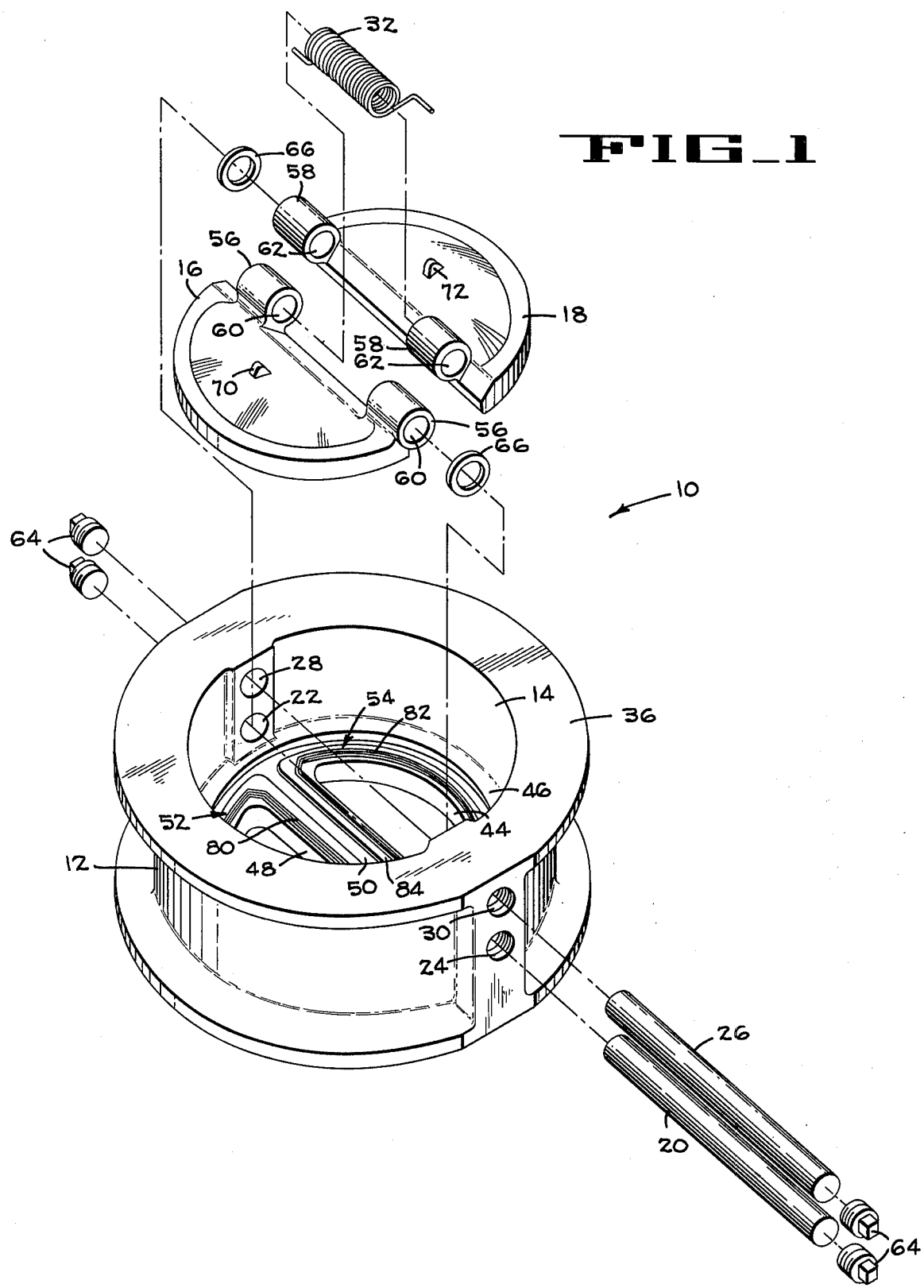
FIG_1

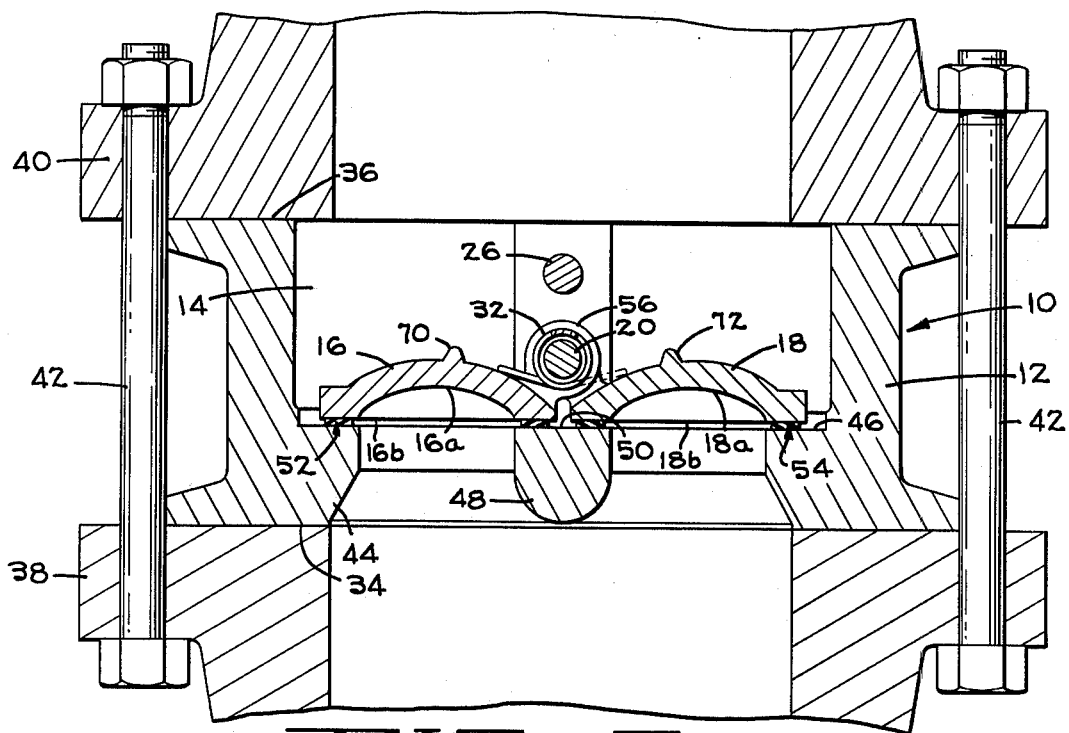
FIG_2
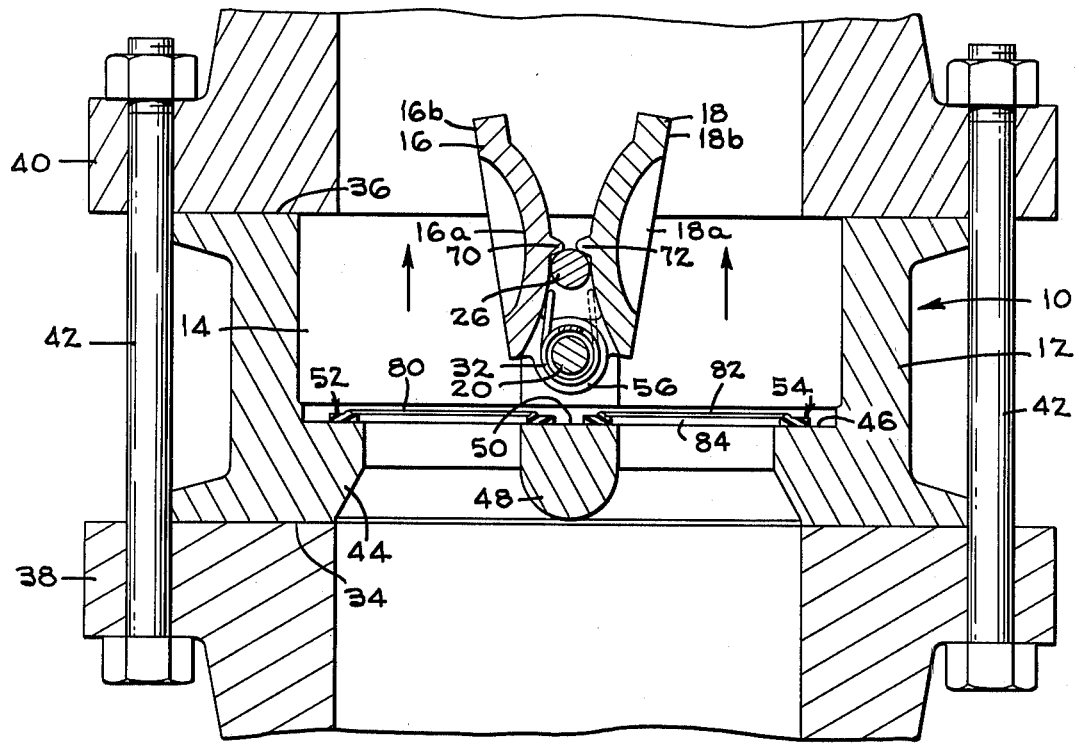
FIG_3

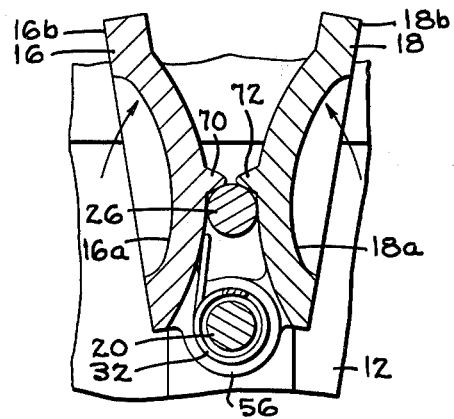
FIG_4
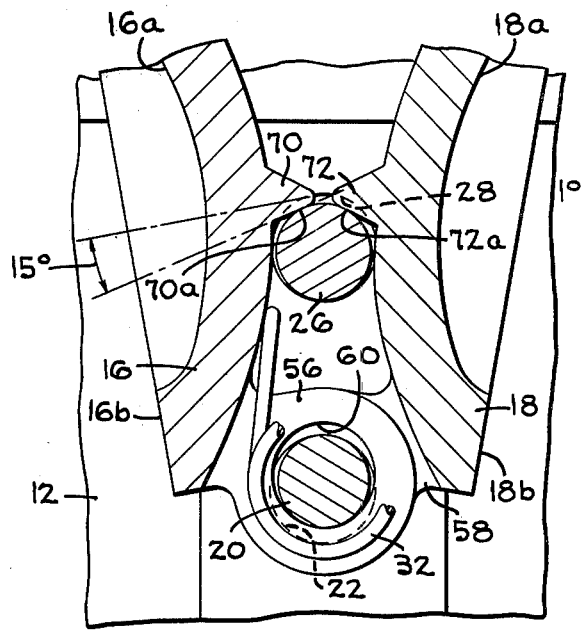
FIG_5
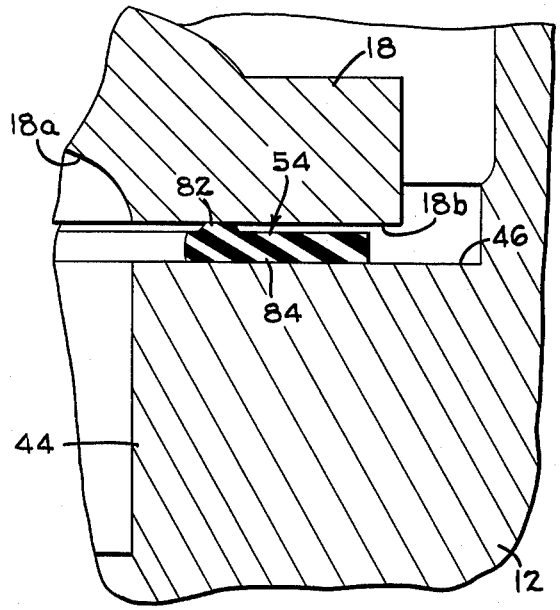
FIG_6
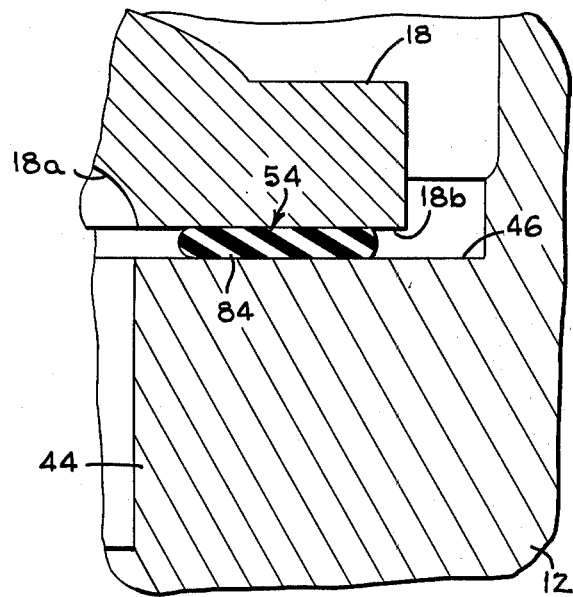
FIG_7

CHECK VALVE

BACKGROUND OF THE INVENTION

The field of art to which the present invention pertains includes check valves with disc-type closure elements pivotally mounted on a shaft for movement between open and closed positions in the valve's flow passage in response to fluid flow through the valve. The invention further relates to check valves of the aforementioned type wherein the discs are spring-biased towards their closed position, and wherein a resilient seat is provided to establish a leak-proof seal between the discs and the valve body when the valve is closed.

A great deal of effort has been directed towards improving disc-type check valves, most of which has been concentrated on the operation and sealing characteristics of the discs in the closed position, and upon their action while moving into that closed position. However, relatively little prior work has been done to solve the problems of wear and instability of the valve internals when under flowing conditions. Conventional flat discs are often unstable during flow through the valve, for at that time unbalanced forces exist due to varying service conditions. Although many designs and configurations of discs and other internal valve elements are known, none of these have overcome the aforementioned wear and stability problems that unduly shorten the useful life of these valves.

Another problem with check valves arises when back pressure is very low due to low fluid head on the downstream side of the valve. Under this condition many such valves leak because the back pressure is insufficient to create enough force to cause deformation of the resilient seat, especially where the seat has a relatively high seal area in order to adequately support the discs during high pressure conditions. Some check valves, such as the type described in Wheeler U.S. Pat. No. 3,074,427, issued Jan. 22, 1963, have resilient seats with beaded or other contoured configurations, but in these structures the seat deforms until metal-to-metal contact is established between the disc and the valve body, thereby greatly limiting the effectiveness of the seat in establishing a fluid-tight seal under all pressure conditions.

SUMMARY OF THE INVENTION

One aspect of the present invention involves the provision of a check valve disc with a concave surface on its upstream side. This concave surface increases the fluid drag on the disc and causes a pressure drop in the direction of fluid flow through the valve, and this combination of drag and pressure drop produces a resultant force on the disc, at a point downstream of its pivot axis, tending to hold the disc in an open unfluttering position.

Another aspect of the present invention is the provision of an angular lug on the downstream side of the disc, this lug cooperating with a stop pin or shaft to draw this shaft and the disc's hinge shaft towards each other. This unique arrangement locks the disc, the stop shaft, the hinge shaft, and the valve body into a rigid relationship such that even under very high flow conditions no movement of the disc takes place.

The foregoing aspects of the invention result in greatly reduced wear of the shafts, of the holes in the valve body in which the shafts are mounted, and also of the holes in the disc hinge through which the hinge shaft extends.

Still another aspect of the present invention is the provision of a resilient seat for the disc, this seat having a raised bead on its disc-contacting surface that facilitates a high unit load on the seat face at low back pressures, and that deforms completely at high back pressures so that the seat can provide a maximum supporting area for the disc. This unique capacity to effectively seal the disc to the valve body at both low and high back pressures significantly enlarges the utility of a valve provided with this advanced type of seat.

Accordingly, one object of the present invention is to provide a new type of disc closure element for a fluid flow check valve, this new disc achieving substantial reduction or elimination of flutter during flow through the valve, and also reduction of wear on the valve's internal elements.

Another object of the present invention is to provide a means for holding a check valve disc, the disc's hinge shaft, and the disc's stop shaft together in a stable condition during fluid flow, thereby resulting in decreased wear on these valve elements.

Yet another object of the present invention is the provision of a new type of resilient seat element for a check valve, this seat element assuring a fluid-tight seal between the valve's disc and body under both low and high pressure conditions.

These and additional objects of the present invention will become more apparent upon reference to the following description thereof, including the drawings to which this description refers.

BRIEF DESCRIPTION OF THE DRAWINGS

FIG. 1 is an exploded isometric of a double disc check valve embodying the features of the present invention.

FIG. 2 is a longitudinal diametrical section, transverse to the hinge and stop shafts, of the valve FIG. 1 in fully assembled condition, showing the discs in their closed position.

FIG. 3 is a view like FIG. 2 showing the discs in their fully opened position.

FIG. 4 is a fragmentary section, on a slightly enlarged scale, of a portion of the valve as illustrated in FIG. 3.

FIG. 5 is an enlarged portion of the fragmentary section of FIG. 4.

FIG. 6 is an enlarged fragmentary section of one disc, its seat, and the adjacent valve body of the valve as shown in FIG. 2, illustrating the relationship of these elements when the valve is closed under low back pressure.

FIG. 7 is a view like FIG. 6, showing the relationship of the elements when the valve is closed under high back pressure.

DESCRIPTION OF THE PREFERRED EMBODIMENT

As illustrated in the drawings, and perhaps most clearly in FIG. 1, a valve assembly 10 according to the present invention generally comprises an annular valve body 12 with a fluid flow passage 14, a pair of disc closure elements 16,18 pivotally mounted in the flow passage 14 on a hinge shaft 20 that is supported in holes 22,24 in the body 12, a disc stop shaft 26 supported in holes 28,30 in the body 12, and a helical spring 32 for biasing the discs 16,18 towards their closed position as shown in FIG. 2. As best seen in FIGS. 2 and 3, the valve body 12 has sealing surfaces 34,36 on its upstream and downstream ends, respectively, which are tightly secured against opposing pipe flanges 38,40 by bolts 42 when the valve 10 is installed in a pipeline.

An annular flange 44, with a downstream-facing surface 46, extends radially into the valve's flow passage 14, and a transverse post 48, with a downstream-facing surface 50, extends diametrically across the flow passage. The surfaces 46 and 50 intersect and are coplanar, and together support a pair of resilient valve seats 52,54 of rubber or other suitable material.

The two discs 16,18 are pivotally mounted on the hinge shaft 20 by means of hinges 56,58, respectively, these hinges having holes 60,62 through which the shaft 20 extends. The holes 60,62 are slightly larger in diameter than the diameter of the shaft 20, thereby providing a loose fit of the shaft in these holes. Similarly, the diameter of the holes 22,24 in the valve's body 12 are slightly larger than the diameter of shaft 20, so that this shaft fits loosely but securely in these holes.

To facilitate quick and easy installation and removal of the hinge shaft 20 and the stop shaft 26, the holes 22,24,28 and 30 extend all the way through the wall of the valve body 12. The outer portions of these holes are threaded to receive pipe plugs 64 for sealing the holes and retaining the shafts 20,26 in the body 12. When the valve is properly assembled, there is some clearance between the ends of the shafts 20,26 and the opposing ends of the adjacent pipe plugs 64, so that the plugs establish a pressure-tight seal with the valve body 12 in the usual manner. Washers 66, of suitable material, are positioned on the hinge shaft 20 between the valve body 12 and the adjacent ends of the disc hinges 56,58, as shown in FIG. 1.

When there is no fluid flow through the valve 10, and also during the presence of back pressure on the valve, i.e., pressure on the downstream side of the valve in excess of pressure on the upstream side, the discs 16,18 are in their fully closed position as illustrated in FIG. 2.

When the upstream pressure exceeds the downstream pressure plus the force exerted by the spring 32 on the discs 16,18, the discs pivot on the hinge shaft 20 away from their resilient seats 52,54, thereby opening the valve and facilitating fluid flow in the direction of the arrows in FIG. 3. As this flow increases, the discs 16,18 pivot until they contact the stop shaft 26. If the upstream sides of the discs 16,18 were planar, when they reached a position parallel to the direction of fluid flow the discs would become unstable due to loss of the resultant force at their centers of gravity as a consequence of the pressure drop across them. Under these conditions the dynamic force due to the differential fluid velocity on the two sides of each disc, in combination with the torque exerted by the spring 32, would tend to pivot the discs towards their closed position. This would result in the discs fluctuating between their fully open position and some intermediate position, and this "fluttering" causes pronounced wear of the disc hinges 56,58, the hinge shaft 20, and the holes 22,24 in the valve body 12, and eventually failure of the valve itself.

To overcome these problems, the discs 16,18 are provided with concave surfaces 16a,18a on their upstream sides as seen best in FIGS. 2-4. As the fluid flows past these surfaces the fluid drag on the discs is increased, thereby producing a lateral force on the discs generally in the direction of the arrows in FIG. 4. This lateral or drag force together with the pressure-drop force that occurs as the fluid flows through the valve create a resultant force on the discs at a location downstream of the stop shaft 26, thereby increasing the moment on the discs tending to pivot them about the hinge shaft 20 towards their fully opened position as shown in FIG. 4. When this force overcomes any force tending to close the discs, such as that exerted by the spring 32, the discs come to rest against the hinge shaft 20. This resultant force has a tendency to then lock the assembly of discs and shafts into a rigid and stable system under fluid flow conditions.

The shape of the curvature of the concave surfaces 16a,18a can be varied so long as it does not defeat the purpose of its presence. A pure radius would be the preferred curvature, but a curvature less than that, i.e., such as illustrated in the drawings, has been found quite satisfactory. As will be understood, the deeper the concavity, the greater will be the force tending to hold the discs in their open position.

The concave surfaces 16a,18a offer an additional advantage in that during fluid flow the discs reside in a stable, fully open position, thereby facilitating a flow capacity that more closely equals that existing when the open discs are disposed 90 degrees from their closed position.

A further advantage provided by the concave surfaced discs of the present invention is that their strength per unit thickness is increased approximately three-fold versus conventional flat plate disc designs.

In order to assure that the discs 16,18 will be locked in a stable, non-fluttering open position during fluid flow through the valve, each disc is provided with a lug 70,72, respectively, that extends outwardly from the surface of the disc's downstream side. These lugs 70,72 are positioned on the discs 16,18 so that their angular surfaces 70a,72a constitute the only surface of the discs that contact the stop shaft 26 when the discs are in their fully open position, as best illustrated in FIG. 5. The attitude of the angular lug surfaces 70a, 72a during high flow rates is such that a wedging action is established between the lugs 70,72 and the shafts 20,26, resulting in a force that causes the discs 16,18 and the hinge shaft 20 to move towards the stop shaft 26, and the stop shaft to move towards the hinge shaft. This movement continues until the shafts come to rest against the adjacent sides of their holes 22,24,28,30, wherein the shafts are in their closest possible position to each other, and the disc hinge holes 60,62 come to rest against the upstream side of the hinge shaft 20, all as illustrated in FIG. 5. In this position, the discs 16,18, shafts 20,26 and valve body 12 are locked into a rigid, stable condition such that even under very high flow conditions no movement of the discs takes place.

In the preferred embodiment, and as indicated in FIG. 5, the lug surfaces 70a,72a are disposed substantially at an angle of about 15 degrees from a perpendicular to the plane of the sealing surfaces 16b,18b of the discs 16,18. However, it should be understood that other angles of disposition of the surfaces 70a,72a can be employed within the scope of this invention, for the principle involved will still be achieved. For example, if a greater wedging or clamping force is desired, a lower angle will be employed, and if a force of less magnitude is desired, the angle can be increased. Tests have shown that an angle of the illustrated 15 degrees gives sufficient wedging or clamping force, and results in reliable engagement of the lug surfaces 70a,72a with the stop shaft 26, in a check valve with normal clearance between the shafts 20,26, their holes in the valve body 12, and between the shaft 20 and the disc hinge holes through which it passes.

As fluid flow through the valve 10 decreases, the discs 16,18 begin to pivot about the hinge shaft 26 towards their resilient seats 52,54 due to the decrease in pressure drop and fluid drag forces. The helical spring 32 forces the discs 16,18 toward the seats 52,54 so that the disc surfaces 16b,18b will be in complete contact with these seats at the instant the flow ceases, thereby preventing undesired flow reversal.

In various fluid conduit systems wherein check valves are used, back pressure is very low due to low fluid head on the downstream side of the valve. Under these conditions, many check valves would leak because a relatively low back pressure does not create sufficient force to deform the seat to the extent a fluid tight seal is established, especially where a relatively large area of the seat is is required to support the disc at the higher pressure rating of the valve. This problem is eliminated by the present invention wherein a continuous sealing bead 80,82 (FIG. 3) is provided on the downstream face of the seats 52,54, respectively.

As shown for example in FIG. 6, the initial contact between the disc 18 and the seat 54 occurs when the disc's sealing surface 18b touches the adjacent surface of the seat bead 82. Because the cross-sectional area of the bead 82 is much smaller than the body 84 of the seat 54, much less back pressure is required to establish a fluid-tight seal between the bead and the disc 18. Thus, a low pressure seal is readily and quickly formed by this first contact.

As the back pressure in the valve increases, the disc 18 is urged more strongly towards the seat 54, and this causes deformation of the bead 82 into the seat's body 84. This deformation continues until the disc sealing surface 18b contacts the body 84 of the seat 54 as shown in FIG. 7, and because of the comparatively large area of the seat body 84 the considerable forces created by the rated sealing pressure are adequately supported without need to ultimately rely on a metal-to-metal contact between the disc surface 18b and the adjacent valve body surface 16 in order to prevent crushing of the seat. Thus, the bead 82 facilitates a high unit load on the seat 54 at low pressures, and then deforms completely into the seat body 84 to facilitate a relatively large seal area that quite adequately supports the disc 18 at very high back pressures.

As the back pressure on the valve 10 is released, the seat body 84, which deflects to some extent under load, returns to its original shape, and the bead 82, which has deflected to the level of the seat body 84, also returns to its previous unpressured configuration, thereby reestablishing the seat 54 into condition to again provide a fluid tight seal between the disc and the valve body.

Although the best mode contemplated for carrying out the present invention has been herein shown and described, it will be apparent that modification and variation may be made without departing from what is regarded to be the subject matter of the invention.

We claim:

1. In a check valve assembly comprising a valve body with a fluid flow passage therethrough, at least one valve disc pivotally mounted on a hinge shaft within the flow passage for movement between open and closed positions, said valve disc having a sealing surface, and stop means for preventing pivotal movement of the disc beyond a predetermined position, the improvement comprising a concave surface on the upstream side of the valve disc for cooperation with fluid flowing through the valve to establish a force tending to urge said disc towards its fully opened position, and at least one wedging means on the surface of the downstream side of the valve disc, said wedging means having a functional surface disposed at an acute angle with respect to a line perpendicular to the valve disc sealing surface, said functional surface cooperating with said stop means to bias said valve disc in a downstream direction.

2. A check valve assembly according to claim 1 wherein the wedging means comprises a lug with an angular surface for contacting the stop means.

3. A check valve assembly according to claim 1 wherein the wedging means includes a surface that cooperates with the stop means to hold the valve disc in a stable, unfluttering condition during fluid flow through said valve assembly.

4. A check valve assembly according to claim 1 including a resilient seat for the valve disc, said seat having bead means to establish a fluid tight seal with said valve disc under conditions of low back pressure, and a body to fully support said valve disc at conditions of high back pressure.

5. In a check valve assembly comprising a valve body with a fluid flow passage therethrough, at least one valve disc pivotally mounted on a hinge shaft within the flow passage for movement between open and closed positions, said valve disc having a sealing surface, and a stop shaft loosely and securely mounted in the valve body for preventing pivotal movement of the disc beyond a predetermined position, the improvement comprising at least one wedging means on the surface of the downstream side of the valve disc, said wedging means having a functional surface disposed at an acute angle with respect to a line perpendicular to the valve disc sealing surface, said wedging means cooperating with the stop shaft to hold said valve disc in an unfluttering, stable condition during fluid flow through said valve assembly, said wedging means also causing said stop shaft to move in a generally upstream direction into a position wherein the valve disc and the stop shaft are held together in a stable condition.

6. A check valve assembly according to claim 5 wherein the wedging means comprises a lug having an angular surface for contacting the stop shaft.

7. A check valve assembly according to claim 5 wherein the wedging means locks the hinge shaft, the stop shaft, and the valve disc together into a stable relationship with the valve body during fluid flow through the valve assembly.

8. A check valve assembly according to claim 5, including a resilient valve seat for establishing a fluid tight seal between said valve body and valve disc, said valve seat having a sealing surface with a continuous bead that provides a seal between said valve disc and said valve body at low back pressures, said bead deforming at high back pressures to establish a high-pressure seal in the absence of direct contact between said disc and body.

* * * * *